(12) United States Patent
Lee et al.

(10) Patent No.: US 12,025,190 B2
(45) Date of Patent: Jul. 2, 2024

(54) DRIVING FORCE DISTRIBUTION DEVICE

(71) Applicants: Hyundai Motor Company, Seoul (KR); Kia Corporation, Seoul (KR); HYUNDAI WIA CORPORATION, Changwon-si (KR)

(72) Inventors: Taewoo Lee, Suwon-Si (KR); Jeong Won Song, Hwaseong-Si (KR); Sung Keun Lim, Hwaseong-Si (KR); JunSeok Park, Seoul (KR); Yeong Taek Lee, Changwon-Si (KR); Won Hee Hong, Changwon-Si (KR); Ji Seung Ryu, Hwaseong-Si (KR)

(73) Assignees: Hyundai Motor Company, Seoul (KR); Kia Corporation, Seoul (KR); HYUNDAI WIA CORPORATION, Changwon-si (KR)

( * ) Notice: Subject to any disclaimer, the term of this patent is extended or adjusted under 35 U.S.C. 154(b) by 98 days.

(21) Appl. No.: 17/880,418

(22) Filed: Aug. 3, 2022

(65) Prior Publication Data
US 2023/0148006 A1    May 11, 2023

(30) Foreign Application Priority Data
Nov. 10, 2021 (KR) .................. 10-2021-0153856

(51) Int. Cl.
| | |
|---|---|
| *F16D 25/12* | (2006.01) |
| *B60K 17/02* | (2006.01) |
| *F16D 21/06* | (2006.01) |
| *F16D 25/10* | (2006.01) |

(52) U.S. Cl.
CPC ............ *F16D 25/123* (2013.01); *B60K 17/02* (2013.01); *F16D 21/06* (2013.01); *F16D 2021/0661* (2013.01); *F16D 25/10* (2013.01); *F16D 2300/06* (2013.01); *F16D 2300/08* (2013.01)

(58) Field of Classification Search
CPC .. F16D 21/02; F16D 21/06; F16D 2021/0607; F16D 2021/0615; F16D 2021/0661; F16D 2021/0692; F16D 25/10; F16D 25/123; F16D 2300/06;
(Continued)

(56) References Cited

U.S. PATENT DOCUMENTS

| | | | | |
|---|---|---|---|---|
| 2013/0199883 | A1* | 8/2013 | Akiba | ............... F16D 21/02 |
| | | | | 192/48.609 |
| 2019/0376565 | A1* | 12/2019 | Oyabu | .................. F16D 21/06 |
| 2020/0182306 | A1* | 6/2020 | Fujii | ................... F16D 25/10 |

FOREIGN PATENT DOCUMENTS

KR     10-2017-0037216 A     4/2017

* cited by examiner

*Primary Examiner* — Richard M Lorence
(74) *Attorney, Agent, or Firm* — MORGAN, LEWIS & BOCKIUS LLP

(57) ABSTRACT

A driving force distribution device includes a lubrication path LP supplying lubricating oil from an oil inlet positioned on the case outside a cylinder into a hub of each clutch unit through an oil hole positioned between an external surface of the cylinder of each operation unit and a bearing supporting the same, between a spacer supporting the bearing and a snap ring supporting the spacer, between an internal diameter of the cylinder of each operation unit and an external diameter of a drum of each clutch unit, and in the drum of each clutch unit, allowing left and right lubrication paths for lubrication of left and right clutch units to have the shortest length, and simultaneously, each flow path to have an increased size.

10 Claims, 5 Drawing Sheets

(58) Field of Classification Search
CPC ..... F16D 2300/08; B60K 17/02; B60K 17/34; B60K 17/344; B60K 2023/043; B60K 23/0808
USPC .............................................. 192/48.606, 49
See application file for complete search history.

DRIVING FORCE DISTRIBUTION DEVICE

CROSS-REFERENCE TO RELATED APPLICATION

The present application claims priority to Korean Patent Application No. 10-2021-0153856 filed on Nov. 10, 2021, the entire contents of which is incorporated herein for all purposes by this reference.

BACKGROUND OF THE PRESENT DISCLOSURE

Field of the Present Disclosure

The present disclosure relates to a driving force distribution device, and more particularly, to a driving force distribution device including a lubrication path for efficient lubrication of left and right clutch units positioned in a case of an axle, and distributing and transmitting the driving force to left and right wheels.

Description of Related Art

In general, when a driving force distribution device of a vehicle distributes a driving force to left and right wheels, each driving force may be independently transmitted to enable a fine handling control of the vehicle, desired by a driver.

For example, when the vehicle performs a turning driving, an understeer phenomenon may occur in the vehicle due to a centrifugal force. However, it is possible to suppress the understeer phenomenon by increasing the driving force acting on a turning external wheel.

That is, when the driving force acting on the turning external wheel is sufficient while the vehicle performs the turning driving, the vehicle may perform the turning driving without occurrence of the understeer phenomenon even at a higher speed than that of a general vehicle.

Accordingly, the vehicle mounting the driving force distribution device therein may perform a more stable and dynamic driving than the general vehicle.

It is important to accurately and precisely transmit a torque for each driving condition to promote driving stability of the vehicle through the driving force distribution desired by the driver.

That is, key technology of the driving force distribution device is to design the left and right driving forces not to interfere with each other.

To improve the handling and traction performance of the vehicle, the driving force distribution device may have a tendency to be applied as a twin clutch coupling module (TCCM) type which may independently control a driving force of a driving source by including left and right clutches separately positioned in a rear axle of a drive system of a rear-wheel-drive vehicle, a four-wheel-drive vehicle, an all-wheel-drive (AWD) vehicle, an electric vehicle or the like.

Meanwhile, a wet friction clutch may be usually applied to the left and right clutch units applied to the above-described driving force distribution device.

The wet friction clutch may have a structure for receiving lubricating oil to cool friction heat.

FIG. 1 is a half cross-sectional view showing a lubrication path of a driving force distribution device according to the related art.

Referring to FIG. 1, the driving force distribution device according to the related art may include a driving gear DG through which a driving force is transmitted to one side in a case 101 of an axle for a vehicle, and left and right clutch units CU1 and CU2 respectively provided on left and right driveshafts DS1 and DS2.

Operations of the left and right clutch units CU1 and CU2 may be controlled by left and right operation units PU1 and PU2 respectively including cylinders CY1 and CY2 and pistons PT1 and PT2 to distribute and transmit the driving force to the left and right driveshafts DS1 and DS2.

The driving force distribution device may include drums 111 and 121 of the left and right clutch units CU1 and CU2, integrally connected to each other by a drum connector 130.

The drums 111 and 121 may each include bearings BR positioned between both end portions thereof and the case 101 to support both sides thereof in an axial direction when power is transmitted.

Accordingly, the conventional driving force distribution device may have the drums 111 and 121 of the left and right clutch units CU1 and CU2, inevitably closed by the bearings BR on both the sides thereof.

Therefore, the lubrication path needs to be provided by avoiding the left and right drums 111 and 121 for lubrication of the left and right clutch units CU1 and CU2.

As shown in FIG. 1, the right clutch unit CU2 may include a right lubrication path LP1 through which lubricating oil is supplied from the outside of the bearing BR supporting between the driving gear DG and the case 101 into a right hub 113 through between the right drum 111 and the right driveshaft DS1.

Furthermore, the left clutch unit CU2 may include a left lubrication path LP2 through which lubricating oil is supplied from the outside of the bearing BR supporting between the left drum 121 and the case 101 into a left hub 123 through between the left drum 121 and the left driveshaft DS2.

Accordingly, the left and right lubrication paths LP1 and LP2 may be long in the conventional driving force distribution device, and loss of the lubricating oil may occur because the oil is supplied through each lubrication path which is a flow path including a narrow gap between each drum 111 or 121 and each driveshaft DS1 or DS2.

The, the first lubrication path LP1 of the right clutch unit CU1 may be connected from the outside of the driving gear DG connected through an extension end portion 111a of the right drum 111 and may thus be longer than the lubrication path LP2 of the left clutch unit CU2.

For the present reason, there is a high possibility that deviation in the clutch performance may occur due to lubrication imbalance of the left and right clutch units CU1 and CU2.

Furthermore, in the conventional driving force distribution device, the left and right clutch units CU1 and CU2 on the left and right lubrication paths LP1 and LP2 are required to commonly use the lubricating oil of the gear unit such as the driving gear DG, deteriorating oil cleanliness, which leads to a reduced durability performance.

Furthermore, in the conventional driving force distribution device, lubricating oil may be supplied from the outside thereof to the inside of the case 101 where each bearing BR is provided, thus requiring a separate space SP connected to each of the left and right lubrication paths LP1 and LP2. As a result, a total length in the axial direction may become longer.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driving force distribution device allowing lubricating oil to be supplied into a hub through each flow path led to an oil hole positioned between an external surface of a cylinder of each operation unit and a bearing supporting the same, between a spacer supporting the bearing and a snap ring, between an internal diameter of the cylinder and an external diameter of a drum inner, and in the drum, allowing left and right lubrication paths for lubrication of left and right clutch units to have the shortest length, and simultaneously, each flow path to have an increased size.

Various aspects of the present disclosure are directed to providing a driving force distribution device which may have a reduced deviation in a lubrication performance of each clutch unit by including left and right lubrication paths made symmetrical to each other, having a minimized deviation in a torque control performance.

Various aspects of the present disclosure are directed to providing a driving force distribution device which may have an improved durability performance of a clutch by allowing a clutch unit and a gear unit to be separately lubricated, thus making it possible to use clutch-only oil for the clutch unit.

According to various exemplary embodiments of the present disclosure, A driving force distribution device in which a clutch unit each positioned on first and second driveshafts in a case of an axle for a vehicle and operated by control of each operation unit to distribute and transmit a driving force transmitted from a driving gear to each of the first and second driveshafts, includes a lubrication path LP supplying lubricating oil from an oil inlet positioned on the case outside a cylinder into a hub of each clutch unit through an oil hole positioned between an external surface of the cylinder of each operation unit and a bearing supporting the same, between a spacer supporting the bearing and a snap ring supporting the spacer, between an internal diameter of the cylinder of each operation unit and an external diameter of a drum of each clutch unit, and in the drum of each clutch unit.

Here, the lubrication path may include: a first flow path through which a plurality of oil grooves are positioned in a bearing seating surface positioned on the external surface of the cylinder of each operation unit and the lubricating oil is introduced between the bearing seating surface and the bearing positioned on the bearing seating surface; a second flow path through which the lubricating oil is introduced through an oil inlet groove having a tooth shape and positioned between an internal diameter of the spacer supporting the bearing and the snap ring supporting the spacer; a third flow path through which the lubricating oil introduced into the first and second flow paths is guided through a gap between the internal diameter of the cylinder of each operation unit and the external diameter of the drum of each clutch unit corresponding thereto; and a fourth flow path through which the lubricating oil guided through the third flow path is supplied into the hub through a plurality of oil holes positioned, toward the hub, in the drum of each clutch unit.

The oil grooves may be a plurality of cut-out surfaces cut in the circular bearing seating surface positioned on the external surface of the cylinder.

Furthermore, the oil grooves may be positioned in four places at a gap of 90 degrees along the circular bearing seating surface.

Here, the bearing positioned on the bearing seating surface may be a cage-integrated thrust bearing.

Furthermore, the oil inlet groove may be positioned between tooth-shaped pubis portions positioned in the internal diameter of the spacer and an external diameter surface of the snap ring.

A support end portion which an internal tip of the cylinder is fitted to and supported by may be positioned on a circumference of an external surface of the drum, and the plurality of oil holes may be positioned corresponding to the hub along an internal circumference of the support end portion.

Furthermore, the lubrication path may form one oil chamber filled with the lubricating oil supplied from the oil inlet on the case by being sealed by a seal ring positioned between the internal tip of the cylinder and the support end portion of the drum corresponding thereto, a seal ring positioned between an external tip of the cylinder and the case corresponding thereto, an external oil seal positioned between an external tip of an external circumferential surface of the drum and the case corresponding thereto, and an internal oil seal positioned between a tip portion of an external circumferential surface of an internal cylinder of the hub and one side of an internal circumferential surface of the drum corresponding thereto.

Here, the hub may have the cylindrical internal cylinder and an external cylinder integrally connected to each other at an internal end portion thereof, and a seating groove is positioned in the hub along an external end portion of the external cylinder, and the drum may include a seating end portion positioned along an internal surface thereof corresponding to the seating groove, and the seating end portion is accommodated in the seating groove to have a fine contact portion formed between the drum and the hub.

Furthermore, a gear hub of the driving gear may have both sides supported to be rotated on both sides of a gear case through the respective bearings, and an oil seal may be positioned between each of two end portions of the gear hub and the gear case on the outside of each bearing.

In the driving force distribution device according to various exemplary embodiments of the present disclosure, the lubrication path may have the shortest length for the lubrication of the left and right clutch units by allowing the lubricating oil to be supplied into the hub through the first flow path between the external surface of the cylinder of each operation unit and the bearing supporting the same, the second flow path between the spacer supporting the bearing and the snap ring supporting the spacer, the third flow path between the internal diameter of the cylinder and the external diameter of the drum, and the fourth flow path led to the oil hole positioned in the drum. Simultaneously, the lubrication path LP may include each flow path having an increased size, preventing the loss of the lubricating oil to improve lubrication performance.

Furthermore, the left and right lubrication paths LP may be symmetrical each other, thus reducing deviation in the lubrication performance of the left and right clutch units CU. For the present reason, it is possible to minimize deviation in a torque control performance of each clutch unit CU, accurately controlling a torque amount.

Furthermore, the clutch unit and the gear unit including the driving gear may be separately lubricated through the internal and external oil seals. Accordingly, it is possible to use clutch-only oil for the clutch unit, improving a durability performance of the clutch.

Furthermore, the lubrication path may be sealed by the two seal rings and the internal and external oil seals to perform the function of one sealed oil chamber. Furthermore, the oil inlet may be positioned on the case to correspond a gap between the bearing supporting the drum and the cylinder. Accordingly, there is no need for a separate space for connecting the oil inlet to the lubrication path, thus reducing a total length of the lubrication path in an axial direction thereof.

Furthermore, an effect which may be obtained or predicted by various exemplary embodiments of the present disclosure is included directly or implicitly in the detailed description of various exemplary embodiments of the present disclosure.

That is, various effects predicted by various exemplary embodiments of the present disclosure are included in the detailed description described below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
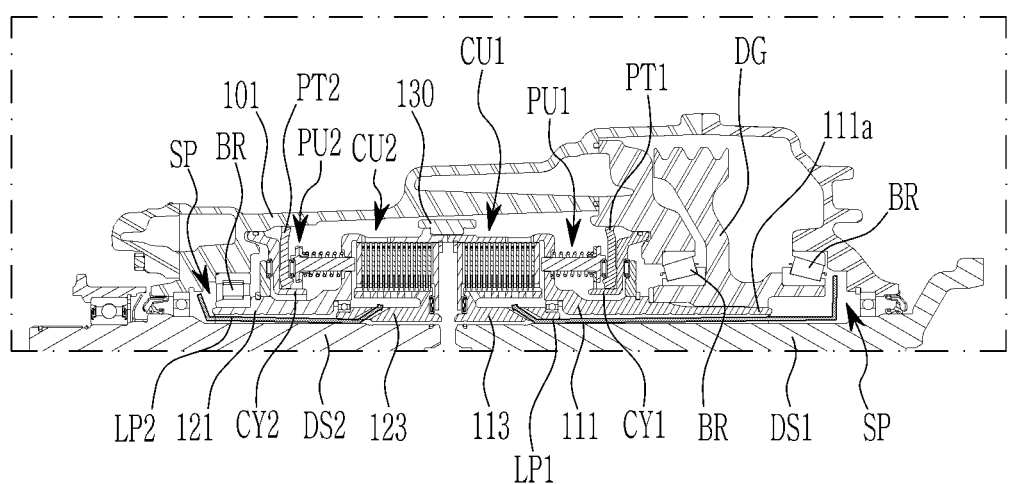
FIG. 1 is a half cross-sectional view showing a lubrication path of a driving force distribution device according to the related art.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

However, to clearly explain various exemplary embodiments of the present disclosure, portions irrelevant to the description are omitted, and the same or similar components are denoted by the same reference numerals throughout the specification.

Figure 2:
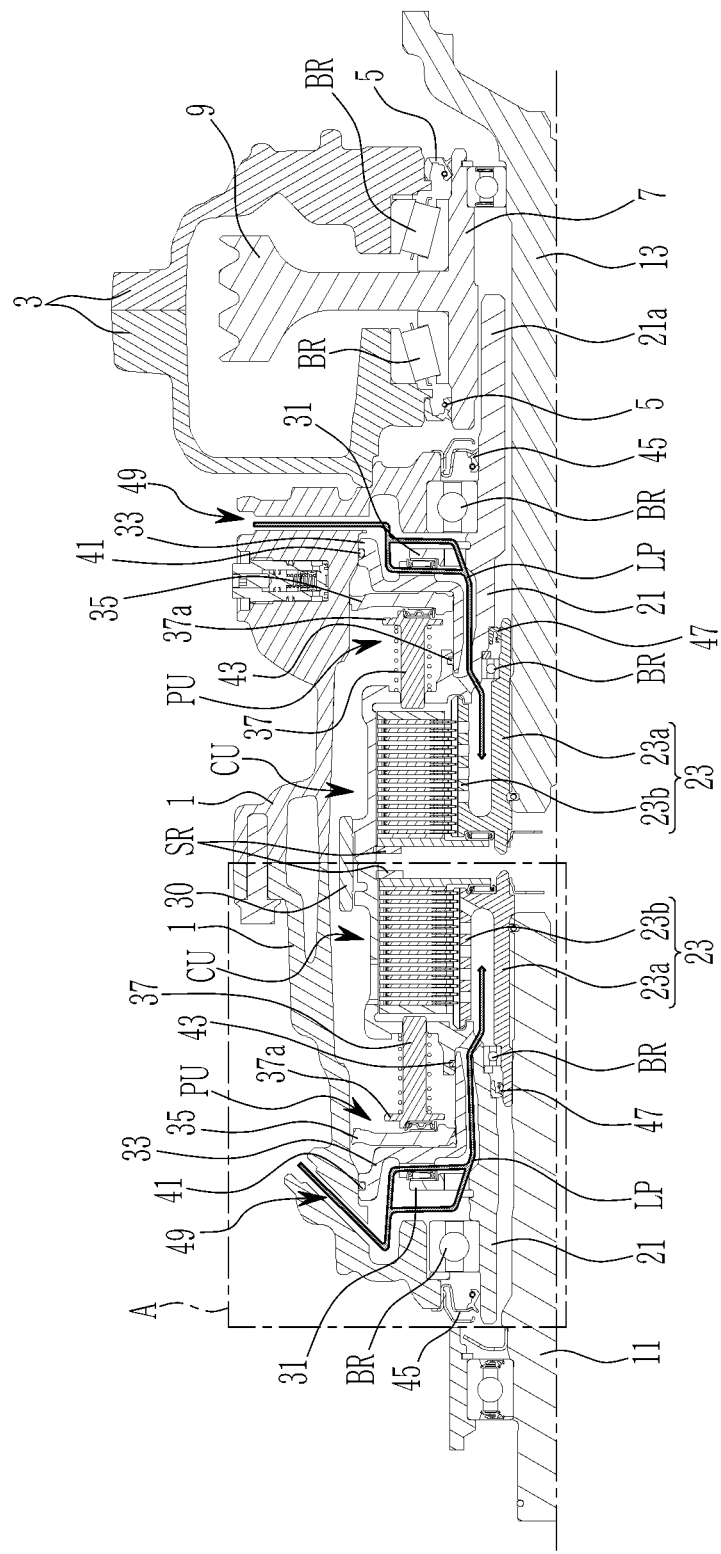
FIG. 2 is a semi-cross-sectional view showing a lubrication path of a driving force distribution device according to various exemplary embodiments of the present disclosure.

FIG. 2 is a semi-cross-sectional view showing a lubrication path of a driving force distribution device according to various exemplary embodiments of the present disclosure.

Referring to FIG. 2, the driving force distribution device according to various exemplary embodiments of the present disclosure may be positioned in a case 1 of an axle for a vehicle.

That is, a driving force of a driving source may be reduced by a reduction gear or the like and then transmitted to a driving gear 9, and a clutch unit CU each provided on the left and right driveshafts 11 and 13 and operated by control of each operation unit PU may distribute and transmit the driving force to each of the left and right driveshafts 11 and 13.

As shown in FIG. 2, various exemplary embodiments of the present disclosure is described on the basis that the left and right driveshafts 11 and 13 are respectively provided on the left and right sides in the drawing. However, the present disclosure is not necessarily limited thereto, the driveshafts may be provided on the opposite positions depending on a viewing direction, and their overall positions in the driving force distribution device are not limited.

Furthermore, the clutch units CU and the operation units PU on the left and right driveshafts 11 and 13 may each have left and right sides symmetrical to each other in the drawing, and may entirely have the same structure as each other except that an external shape of the corresponding case 1 is partially different from each other.

The driving force distribution device may be applied in the axle of a driving system such as a rear-wheel-drive vehicle, a four-wheel-drive vehicle, an all-wheel-drive (AWD) vehicle, an electric vehicle or the like, and may be provided as a twin clutch coupling module (TCCM) type which may independently control the driving force from the driving source to a rear wheel or all wheels.

The case 1 may be separated into left and right sides and assembled with each other.

The case 1 may provide a space in which the left and right driveshafts 11 and 13, each clutch unit CU and each operation unit PU are provided.

The driving gear 9 may be provided through a separate gear case 3.

Here, a gear hub 7 of the driving gear 9 may have both sides supported to be rotated on both sides of the gear case 3 through the respective bearings BR.

Here, an oil seal 5 may be positioned between each of two end portions of the gear hub 7 and the gear case 3 on the outside of each bearing BR.

Accordingly, the inside of the gear case 3 in which the driving gear 9 is provided may be completely separated from the inside of the case 1 in which the left and right driveshafts 11 and 13, each clutch unit CU and each operation unit PU are provided.

The driving source may be an internal combustion engine burning fossil fuel, a motor using electrical energy or the like.

The driving force distribution device according to various exemplary embodiments of the present disclosure may include each clutch unit CU and each operation unit PU positioned on each external circumferential side of the left and right driveshafts 11 and 13.

As shown in FIG. 2, the right clutch unit CU may have an extending end portion 21a positioned at a tip portion of a drum 21 in the axial direction thereof.

The driving gear 9 may be spline-coupled to the extending end portion 21a.

Furthermore, the respective drums 21 of the clutch units CU may be connected to each other by a drum connector 30.

Hubs 23 may respectively be spline-coupled and connected to the left and right driveshafts 11 and 13.

Therefore, the driving force transmitted to the driving gear 9 may be distributed and transmitted to the left and right driveshafts 11 and 13 while operations of the corresponding clutch units CU are each independently controlled by hydraulic pressure acting on each operation unit PU.

Hereinafter, the description describes detailed configurations of the clutch unit CU and the operation unit PU, which are main components of the driving force distribution device according to various exemplary embodiments of the present disclosure with reference to FIG. 3 and FIG. 4.

Here, the clutch units CU and the operation units PU on the left and right driveshafts 11 and 13 may each have the left and right sides symmetrical to each other in the drawing, and may entirely have the same structure as each other except that the external shape of the corresponding case 1 is partially different from each other. The description is made in detail based on the left clutch unit CU and the left operation unit PU with reference to FIG. 3 and FIG. 4.

Hereinafter, the clutch units CU and the operation units PU each on the left and right driveshafts 11 and 13 are referred to as the clutch unit CU and the operation unit PU without distinction between the left unit and the right unit.

First, the clutch unit CU may include the drum 21, the hub 23, a plurality of clutch plates 25 positioned between the drum 21 and the hub 23, a plurality of clutch disks 27, a separation plate 28 and a pressure plate 29.

The drum 21 may be provided parallel to the left driveshaft 1 in the axial direction, and have an external tip roll-supported on an internal surface of the case 1 by the bearing BR.

The hub 23 may have a cylindrical internal cylinder 23a and an external cylinder 23b integrally connected to each other at its internal end portion.

The internal cylinder 23a in the drum 21 may be spline-coupled to the left driveshaft 11.

Here, the internal cylinder 23a of the hub 23 may have an external tip roll-supported on an internal circumferential side of the drum 21 by the bearing BR.

Furthermore, the plurality of clutch plates 25 may be spline-coupled to an internal circumferential surface of the drum 21 to be rotated with the drum 21.

The plurality of clutch disks 27 may be provided between the plurality of clutch plates 25 and spline-coupled to an external circumferential surface of the external cylinder 23b of the hub 23 to be rotated with the hub 23.

The separation plate 28 may be spline-coupled into the drum 21 on the internal circumferential surface by corresponding to the clutch unit CU on the opposite side, and supported not to be moved inward in the axial direction by a snap ring SR.

Furthermore, the separation plate 28 may have a central circumference roll-supported on an internal surface of the hub 23 by the bearing BR.

The pressure plate 29 may be spline-coupled to the outside of the drum 21 on the internal circumferential surface.

This pressing plate 29 may evenly transmit a pressing force transmitted from the operation unit PU to the clutch plate 25 and the clutch disk 27.

Furthermore, the operation unit PU may be positioned outside an external diameter of the drum 21 by corresponding to the outside of the clutch unit CU, and include a spacer 31, a cylinder 33, a piston 35, a plurality of pushrods 37 and a plurality of springs 39.

The spacer 31 may be fitted into the external diameter of the external tip of the drum 21 and supported not to be moved outward in the axial direction by the snap ring SR.

The cylinder 33 may be fitted into the external diameter of the drum 21 to have an external circumferential end portion sealed to the internal surface of the case 1 by a seal ring 41.

An external surface of the cylinder 33 may be roll-supported on the spacer 31 by the bearing BR.

The piston 35 may be fitted between the internal surface of the case 1 and the external diameter of the cylinder 33 to form a hydraulic chamber LC between the piston and the cylinder 33.

The plurality of pushrods 37 may be provided at regular gaps along a circumference of the external diameter of the drum 21.

External tips of each pushrod 37 may be connected to each other by a flange 37a and roll-supported on the piston 35 by the bearing BR, and An internal tip of each pushrod 37 may penetrate through a side surface of the drum 21, and be provided corresponding to the pressure plate 29 of the clutch unit CU.

The plurality of springs 39 may be respectively fitted to the plurality of pushrods 37 to have both end portions supported between the side surface of the drum 21 and the flange 37a of the pushrod 37.

The plurality of springs 39 may provide the pushrod 37 with a restoring force using elasticity.

When the hydraulic pressure supplied from a corresponding hydraulic actuator outside the case 1 is supplied to the hydraulic chamber LC positioned between the cylinder 33 and the piston 35, the operation unit PU may control the piston 35 to push the pressure plate 29 inward by use of the pushrod 37 to engage the clutch unit CU.

Here, the pressing force of the piston 35 generated by the hydraulic pressure and a reaction force generated by the cylinder 33 may be all off-set on the drum 21 by being supported by each of the separation plate 28 supported on the inside of the drum 21 by the snap ring SR and the spacer 31 supported on the outside of the drum 21 by the snap ring SR.

Meanwhile, the driving force distribution device having the present configuration may have a lubrication path LP including left and right sides symmetrical to each other to cool each clutch unit CU, as shown in FIG. 2.

Figure 3:
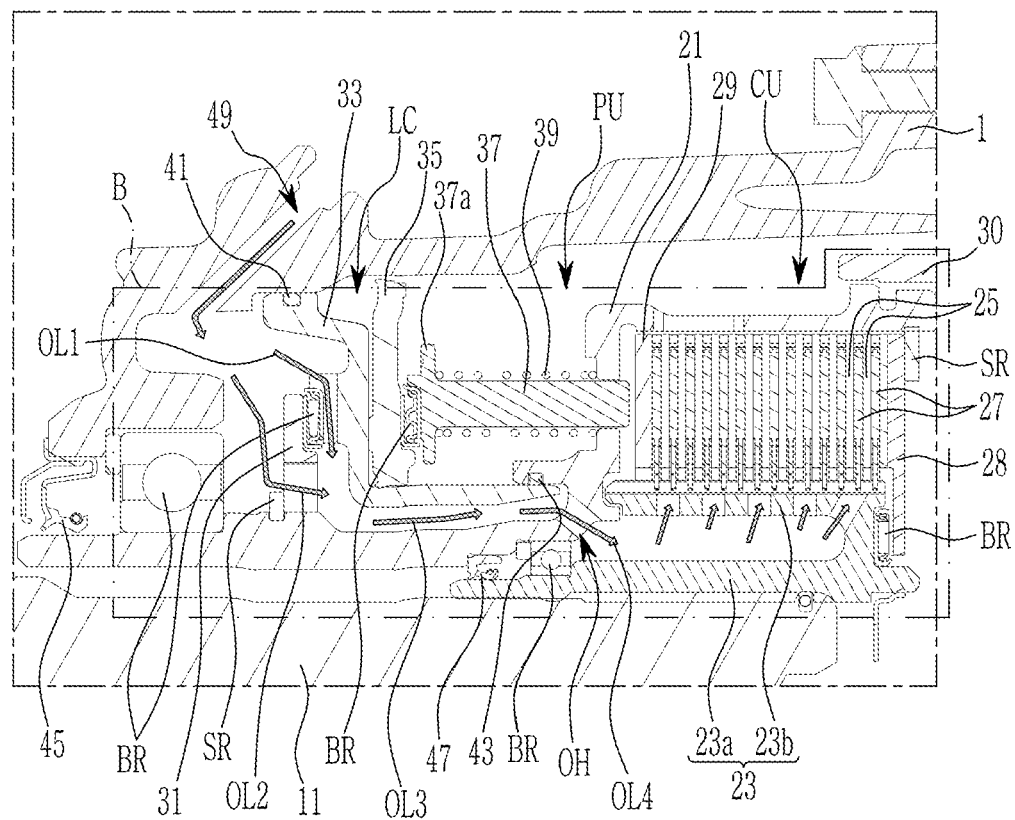
FIG. 3 is an enlarged cross-sectional view of portion A of FIG. 2.
Figure 4:
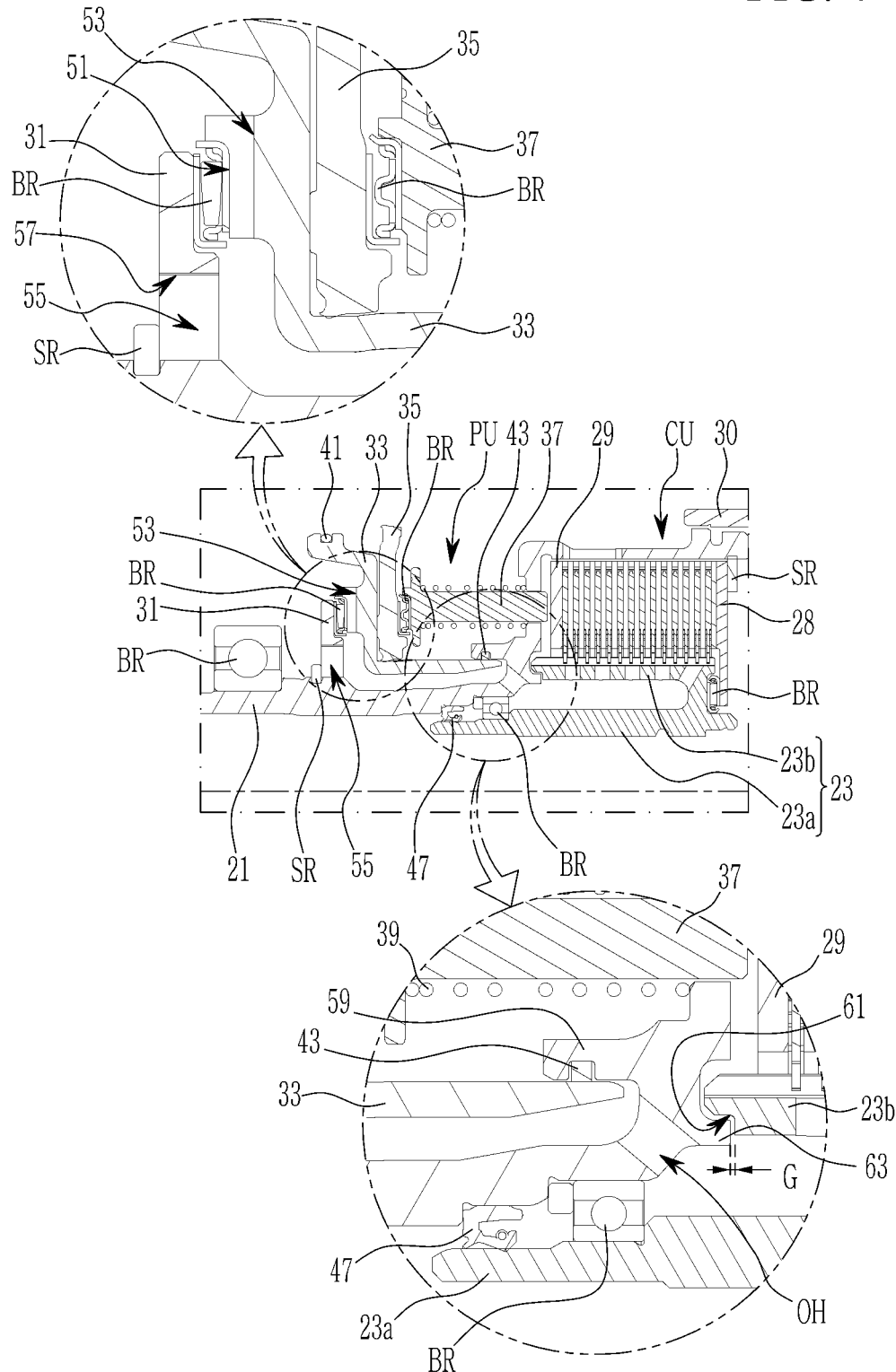
FIG. 4 is an enlarged cross-sectional view of a portion B of FIG. 3.

Referring to FIG. 3 and FIG. 4, the lubrication path LP as shown in FIG. 2 may include a first flow path OL1 passing between the external surface of the cylinder 33 of each operation unit PU and the bearing BR supporting the same, a second flow path OL2 passing between the spacer 31 supporting the bearing BR and the snap ring SR supporting the spacer 31, a third flow path OL3 passing between an internal diameter of the cylinder 33 of each operation unit PU and the external diameter of the drum 21 of each clutch unit CU, and a fourth flow path OL4 passing through an oil hole OH positioned in the drum 21 of each clutch unit CU.

The lubrication path LP including the first, second, third and fourth flow paths OL1, OL2, OL3 and OL4 may guide lubricating oil to be supplied from an oil inlet 49 positioned on the case 1 corresponding to the outside of the cylinder 33 into the hub 23 of each clutch unit CU.

First, the first flow path OL1 may be a flow path through which a plurality of oil grooves 53 are positioned in a bearing seating surface 51 positioned on the external surface of the cylinder 33 of the operation unit PU, and the lubricating oil is introduced between the bearing seating surface 51 and the bearing BR positioned on the bearing seating surface 51.

Figure 5:
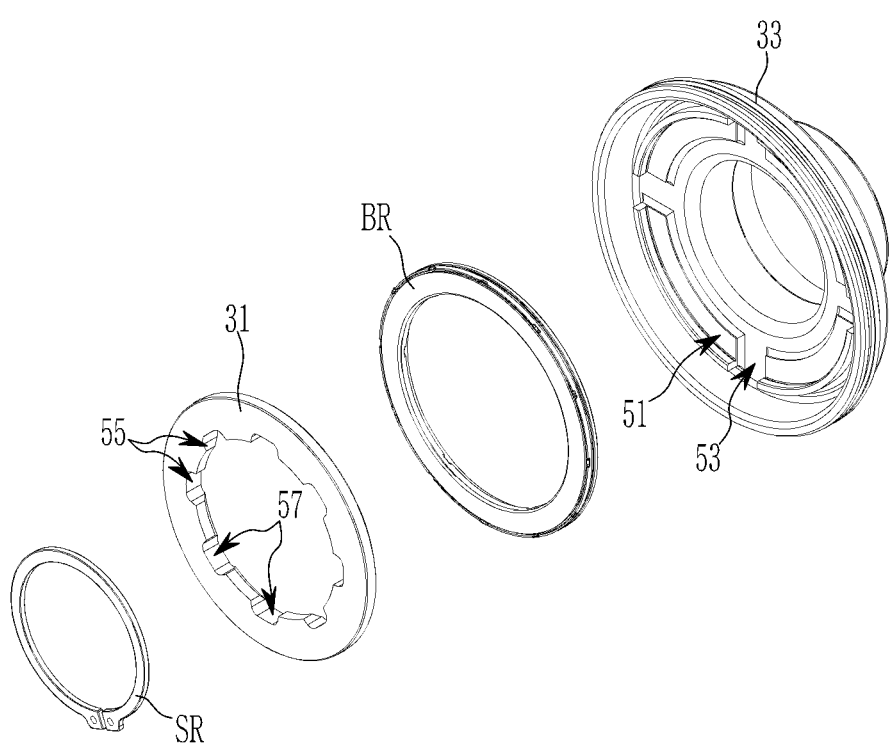
FIG. 5 is a perspective view showing a cylinder and a spacer, applied to one operation unit of the driving force distribution device according to various exemplary embodiments of the present disclosure.

FIG. 5 is a perspective view showing the cylinder and the spacer, applied to one operation unit of the driving force distribution device according to various exemplary embodiments of the present disclosure.

Referring to FIG. 5, the oil grooves 53 may be a plurality of cut-out surfaces cut in the circular bearing seating surface 51 positioned on the external surface of the cylinder 33.

Here, the oil grooves 53 may be positioned in four places at a gap of 90 degrees along the circular bearing seating surface 51.

Various exemplary embodiments of the present disclosure shows an example in which the oil grooves 53 are positioned in the four places along the circular bearing seating surface 51. However, the present disclosure is not necessarily limited thereto, and more or less oil grooves 53 may be positioned by adjusting their gaps when necessary.

Furthermore, the bearing BR positioned on the bearing seating surface 51 may form the flow path together with the oil groove 53.

Here, the bearing BR may be a cage-integrated thrust bearing so that its operation is not affected by the lubricating oil passing through the oil groove 53.

Furthermore, the second flow path OL2 may be a flow path through which the lubricating oil is introduced through an oil inlet groove 55 having a tooth shape and positioned between an internal diameter of the spacer 31 supporting the bearing BR and the snap ring SR supporting the spacer 31.

Referring to FIG. 5, the oil inlet groove 55 may be positioned between tooth-shaped pubis portions 57 positioned in the internal diameter of the spacer 31 and an external diameter surface of the snap ring SR.

Furthermore, the third flow path OL3 may be a flow path through which the lubricating oil introduced into the first and second flow paths OL1 and OL2 is axially guided through a gap between the internal diameter of the cylinder 33 of the operation unit PU and the external diameter of the drum 21 of the clutch unit CU corresponding thereto.

Here, the third flow path OL3 may be formed by inserting an internal tip of the cylinder 33 into a circumference of the external surface of the drum 21.

That is, a support end portion 59 may be positioned on the circumference of the external surface of the drum 21.

Furthermore, the internal tip of the cylinder 33 may be fitted into the support end portion 59 while having a seal ring 43 interposed therebetween.

The fourth flow path OL4 may be a flow path through which the lubricating oil guided through the third flow path OL3 is supplied into the hub 23 between the internal cylinder 23*a* and the external cylinder 23*b* through the plurality of oil holes OH positioned, toward the hub 23, in the drum 21 of the clutch unit CU.

Here, the plurality of oil holes OH positioned in the drum 21 may be positioned corresponding to a gap between the internal cylinder 23*a* and the external cylinder 23*b* of the hub 23 along an internal circumference of the support end portion 59.

Furthermore, a seating groove 61 may be positioned in the hub 23 along an external end portion of the external cylinder 23*b*.

The drum 21 may include a seating end portion 63 positioned along an internal surface thereof corresponding to the seating groove 61.

Accordingly, the seating end portion 63 may be accommodated in the seating groove 61 so that a gap G between the drum 21 and the hub 23 includes a fine contact portion.

Here, the fine gap G of the contact portion formed by the seating groove 61 and the seating end portion 63 may allow each of the drum 21 and the hub 23 to be rotated, and simultaneously minimize loss of lubricating oil occurring in the hub 23.

The gap G may be set to less than 1 mm, and may usually be set to 0.5 mm.

In the lubrication path LP of the driving force distribution device having the present configuration, the seal ring 43 may be positioned between the internal tip of the cylinder 33 and the support end portion 59 of the drum 21 corresponding thereto.

Furthermore, the seal ring 41 may be positioned between an external tip of the cylinder 33 and the case 1 corresponding thereto.

Furthermore, an external oil seal 45 may be positioned between an external tip of an external circumferential surface of the drum 21 and the case 1 corresponding thereto.

Furthermore, an internal oil seal 47 may be positioned between a tip portion of an external circumferential surface of the internal cylinder 23*a* of the hub 23 and one side of the internal circumferential surface of the drum 21 corresponding thereto.

That is, the lubrication path LP may be sealed by the two seal rings 41 and 43 and the internal and external oil seals 47 and 45.

Accordingly, the lubrication path LP may also perform a function of an oil chamber filled with the lubricating oil supplied from the oil inlet 49 on the case 1.

Therefore, as described above, in the driving force distribution device according to various exemplary embodiments of the present disclosure, each clutch unit CU may be always released by the elasticity of the spring 39.

Furthermore, the driving force distribution device according to the exemplary embodiment of the present disclosure may include the left and right clutch units CU whose operation is controlled independently from each other without interference by an operation pressure of each operation unit PU, increasing an accuracy in controlling a torque amount of the driving force transmitted through the driving gear 9 and then distributing the driving force to the left and right driveshafts 11 and 13.

That is, the left and right clutch units CU may independently perform operations such as engagement and release control and engagement force control by the hydraulic pressure supplied to each operation unit PU, and may accurately and independently vary and control the driving force and torque transmitted to the left and right driveshafts 11 and 13.

Furthermore, in the driving force distribution device according to various exemplary embodiments of the present disclosure, the lubrication path LP for cooling each of the left and right clutch units CU may have the shortest length for the lubrication of each clutch unit CU by allowing the lubricating oil to be supplied into the hub 23 between the internal cylinder 23a and the external cylinder 23b through the first, second, third and fourth flow paths OL1, OL2, OL3 and OL4.

Simultaneously, the lubrication path LP may include each flow path OL1, OL2, OL3 or OL4 having a size increased as much as possible, preventing the loss of the lubricating oil to improve lubrication performance.

Furthermore, the left and right lubrication paths LP may be symmetrical each other, thus reducing the deviation in the lubrication performance of the left and right clutch units CU. For the present reason, it is possible to minimize the deviation in a torque control performance of each clutch unit CU, accurately controlling the torque amount.

Furthermore, in an exemplary embodiment of the present disclosure, the clutch unit CU and the gear unit including the driving gear 9 may each be separately lubricated through the internal and external oil seals 47 and 45.

Accordingly, in an exemplary embodiment of the present disclosure, it is possible to use clutch-only oil for the clutch unit CU, improving the durability performance of the clutch.

Furthermore, the lubrication path LP may be sealed by the two seal rings 41 and 43 and the internal and external oil seals 47 and 45 to perform the function of one sealed oil chamber.

Furthermore, the oil inlet 49 may be positioned on the case 1 to correspond a gap between the cylinder 33 and the bearing BR supporting the drum 21. Accordingly, there is no need for a separate space for connecting the oil inlet 49 to the lubrication path LP, thus reducing an overall total length of the lubrication path.

Furthermore, it is possible to extend an oil change interval by use of oil.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driving force distribution apparatus in which a clutch unit each provided on first and second driveshafts in a case of an axle for a vehicle and operated by control of operation units to distribute and transmit a driving force transmitted from a driving gear to each of the first and second driveshafts, the driving force distribution apparatus comprising:
    a lubrication path supplying lubricating oil from an oil inlet provided on the case outside a cylinder into a hub of each clutch unit through a plurality of oil holes provided between an external surface of the cylinder of each of the operation units and a bearing supporting the cylinder, between a spacer supporting the bearing and a snap ring supporting the spacer, between an internal diameter of the cylinder of each of the operation units and an external diameter of a drum of each clutch unit, and in the drum of each clutch unit.

2. The driving force distribution apparatus of claim 1, wherein the lubrication path includes:
    a first flow path passing between the external surface of the cylinder of each of the operation units and the bearing supporting the cylinder;
    a second flow path through which the lubricating oil is introduced through an oil inlet groove having a tooth shape and provided between an internal diameter of the spacer supporting the bearing and the snap ring supporting the spacer;
    a third flow path through which the lubricating oil introduced into the first and second flow paths is guided through a gap between the internal diameter of the cylinder of each of the operation units and the external diameter of the drum of each clutch unit corresponding thereto; and
    a fourth flow path through which the lubricating oil guided through the third flow path is supplied into the hub through the plurality of oil holes provided, toward the hub, in the drum of each clutch unit.

3. The driving force distribution apparatus of claim 2, wherein the first flow path through which a plurality of oil grooves are provided in a circular bearing seating surface is provided between the bearing mounted on the circular bearing seating surface and the external surface of the cylinder of each of the operation units and the lubricating oil is introduced between the circular bearing seating surface and the bearing provided on the circular bearing seating surface.

4. The driving force distribution apparatus of claim 3, wherein the oil grooves are a plurality of cut-out surfaces cut in the circular bearing seating surface provided on the external surface of the cylinder.

5. The driving force distribution apparatus of claim 4, wherein the oil grooves are provided in four places at a gap of 90 degrees along the circular bearing seating surface.

6. The driving force distribution apparatus of claim 2, wherein the bearing is a cage-integrated thrust bearing.

7. The driving force distribution apparatus of claim 2, wherein a support end portion which an internal tip of the cylinder is fitted to and supported by is provided on a circumference of an external surface of the drum, and the plurality of oil holes are provided corresponding to the hub along an internal circumference of the support end portion.

8. The driving force distribution apparatus of claim 7, further including:
    a first seal ring, a second seal ring, an external oil seal, and an internal oil seal,
    wherein the lubrication path forms an oil chamber filled with the lubricating oil supplied from the oil inlet on the case by being sealed by the first seal ring provided between the internal tip of the cylinder and the support end portion of the drum corresponding thereto, the second seal ring provided between an external tip of the cylinder and the case corresponding thereto, the external oil seal provided between an external tip of an external circumferential surface of the drum and the case corresponding thereto, and the internal oil seal provided between a tip portion of an external circumferential surface of a cylindrical internal cylinder of the hub and one side of an internal circumferential surface of the drum corresponding thereto.

9. The driving force distribution apparatus of claim 8,
wherein the hub includes the cylindrical internal cylinder and an external cylinder integrally connected to each other at an internal end portion thereof, and a seating groove is provided in the hub along an external end portion of the external cylinder, and
wherein the drum includes a seating end portion provided along an internal surface thereof corresponding to the seating groove, and the seating end portion is accommodated in the seating groove to have a fine contact portion formed between the drum and the hub.

10. The driving force distribution apparatus of claim 1, further including a plurality of oil seals,
wherein a gear hub of the driving gear has first and second sides supported to be rotated on first and second sides of a gear case through respective bearings, and the plurality of oil seals is provided between each of first and second end portions of the gear hub and the gear case on the outside of each bearing.

* * * * *